United States Patent [19]

Sibley

[11] Patent Number: 4,499,685
[45] Date of Patent: Feb. 19, 1985

[54] SUPPORT MEANS FOR A ROTATING FRAME ANIMAL BODY TRAP

[76] Inventor: James N. Sibley, Taylor Ford La., Rte. 28, Knoxville, Tenn. 37920

[21] Appl. No.: 408,467

[22] Filed: Aug. 16, 1982

[51] Int. Cl.³ .............................................. A01M 23/26
[52] U.S. Cl. .......................................................... 43/96
[58] Field of Search .................. 43/96, 88, 58, 90, 91, 43/93

[56] References Cited

U.S. PATENT DOCUMENTS

| 2,406,180 | 8/1946 | Wampler | 43/96 |
| 3,010,245 | 11/1961 | Conibear | 43/97 |
| 3,747,259 | 7/1973 | Pellowski | 43/90 |
| 3,974,592 | 8/1976 | Staats | 43/96 |
| 4,152,861 | 5/1979 | Miller | 43/96 |

FOREIGN PATENT DOCUMENTS 867032 3/1971 Canada ................................... 43/96

Primary Examiner—Gene P. Crosby
Attorney, Agent, or Firm—Pitts and Brittian

[57] ABSTRACT

Apparatus for supporting a Conibear or rotating frame animal trap in a desired position is disclosed. A stabilizing support means is located adjacent the pivot point (32). A clamp support means includes a support plate (60) which is pivotally mounted at pivot point (32) in a position such that it is parallel to side members (24) and (28). A clamp (70) is attached in a non-rotating manner to support plate (60) for gripping a support stake (78) to maintain the trap in a selected position and location. At least three extensions (62, 64 and 68) are fixedly mounted to support plate (60) and extend in such a manner that they contact side members (24) and (28) and thereby prevent rotation of the frames (10) and (12) with respect to the support stake (78) while at the same time allowing the frames (10) and (12) to rotate with respect to each other to the closed position when release catch (40) is triggered.

6 Claims, 3 Drawing Figures

U.S. Patent    Feb. 19, 1985    4,499,685
Fig. 1
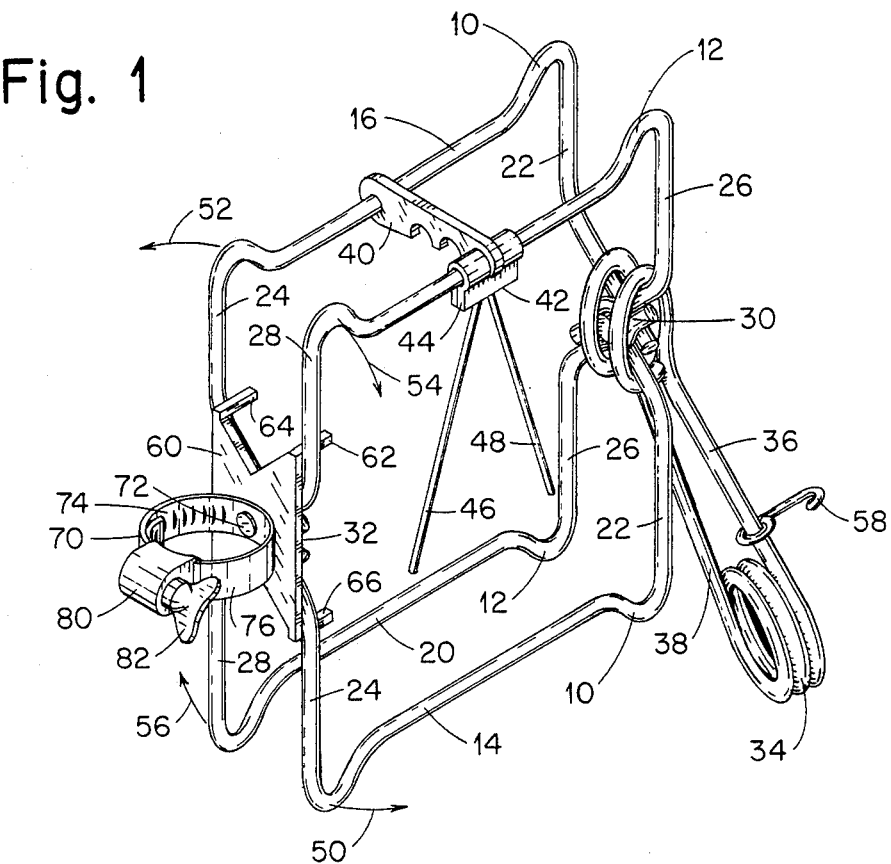
Fig. 2
Fig. 3
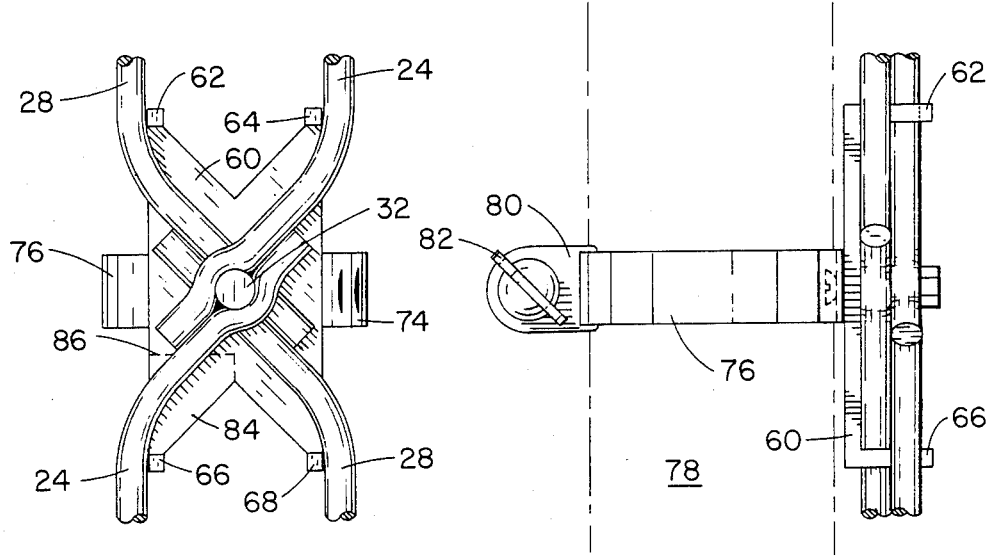

SUPPORT MEANS FOR A ROTATING FRAME ANIMAL BODY TRAP

TECHNICAL FIELD

This invention relates generally to an animal trap and more particularly to rotating frame or animal body traps which are typically used to trap fur bearing animals such as beaver, mink, muskrat and the like. These type of traps are typically identified as Conibear traps which is the name of the original inventor of this type trap. The present invention involves a new technique for supporting the rotating frame trap in a desired location such as the pathway of a fur bearing animal such as the mink or beaver. The new stabilizing clamping means or supporting technique of this invention also allows for easy setting and positioning of the trap.

BACKGROUND ART

There are various types of animal traps presently used in the fur trapping industry. Further, there are a significant number of traps which are of the Conibear type which are typically preferred by the industry, since such traps are more humane and avoid damaging the pelt of the trapped animal. As an example, U.S. Pat. No. 3,010,245 issued to F. E. Conibear on Nov. 28, 1961 discloses the basic rotating frame trap. However, in addition to the original Conibear trap patent, there are other patents which disclose improvements to the Conibear technique, such as the improvement disclosed in U.S. Pat. No. 3,747,259 issued to Daniel W. Pellowski on July 24, 1973. The Pellowski trap provides means for mounting the trap to a stake or pole and further discloses a coiled spring technique for operating the rotating jaws.

U.S. Pat. No. 3,974,592, issued to Stanley E. Staats on Aug. 17, 1976 also discloses a rotating frame or Conibear type trap which works in combination with a pair of forked stakes for supporting the trap. The stakes comprise a pair of prongs which include pegs protruding inwardly to straddle each of the pivots of the trap. The prongs are held together by rings that slide into position by gravity after a trap is positioned between the prongs. The prongs are inserted in the ground to hold the trap at the desired height.

As can be seen from the aforementioned Staats Patent, and U.S. Pat. No. 4,111,885, issued to Ray L. Carter on Oct. 10, 1978, although the Conibear or rotating frame type trap is very effective when set and positioned correctly, it is often difficult to locate and support the trap so that the rotating frames always remain in the desired position and across the pathway of the targeted animal. Consequently, techniques for supporting the trap in the desired location or position are the subject matter of the Staat and the Carter Patents. The Carter Patent discloses a device for supporting the trap by means of an elongated strap which has a central raised member which forms two slots between the strap and the raised member for receiving the jaws of the trap. Thus, the trap is supported on the extended elongated strap.

Still another type of holder or support means for the Conibear or rotating frame trap is disclosed in U.S. Pat. No. 4,152,861 issued to Wesley T. Miller on May 8, 1979. This holder utilizes resilient fingers mounted on an elongated body, stake or rod. The fingers include recesses wherein the jaws of the trap are received in the recesses to support the trap in a predetermined manner when the trap is "set", such that upon being released or sprung the holder fingers do not interfer with the trap operation and the trap structure is automatically released from the holder.

Of course, all sorts of traps other than the Conibear trap experience problems associated with supporting and maintaining the trap at a desired location. For example, U.S. Pat. No. 2,406,180 issued to I. W. Wampler, et.al. on Aug. 20, 1946 shows a technique for staking or securing a standard small animal trap other than the Conibear type.

Therefore, from the above discussed traps, it will be appreciated that rotating frame animal traps are typically supported in the pathway or swimway of a small fur bearing animal such as the mink, muskrat or beaver. It will also be appreciated that these type traps must be maintained in a particular position and location otherwise the animal will not swim or move through the open frames and may simply move over, above or around the trap. Therefore, since such traps are often located under water, it will be appreciated that "setting" the traps and then locating them in the correct position to avoid springing the traps sometimes creates problems. Further, the trap is designed to catch the animal without doing damage to the pelt, and therefore the trap is typically secured so that it allows some motion or rotation after the trap has been sprung but remains substantially immobile prior to being tripped.

Therefore, it is an object of the present invention to provide a simple and inexpensive technique for supporting a rotating frame trap in a fixed location in such a manner that the operation of the trap is not detrimentally affected.

It is still another object of the present invention to provide a means of supporting the rotating frame trap on a support stake of selected length and diameter.

It is yet another object of this invention to provide a means for supporting a Conibear or rotating frame trap by selectively clamping the trap to a supporting stake of desired length or diameter.

DISCLOSURE OF THE INVENTION

Other objects and advantages will in part be obvious, and will in part appear hereinafter, and will be accomplished by the present invention which provides in combination a single spring rotating frame or Conibear trap with a stabilizing clamp or support. The trap portion includes jaws formed by a pair of frames. Each one of the pair of frames have two parallel side members and two parallel jaw members. The parallel jaw members and side members are joined such that they are substantially perpendicular to each other and thereby form the "frame". The pair of frames are then pivotally mounted with respect to each other at a pair of pivot points located at the side members such that the parallel jaws of one of the frames can rotate to a closed position proximate the parallel jaws of the other frame. Also included is a means for biasing the jaws in the closed position. In a preferred embodiment, the biasing means is a spring which works in conjunction with one of the pivot points. Releasable control means or a catch is operated by a trigger such that the releasable control means holds the jaws in the open or "set" position against the bias of the spring means. This rotating frame trap operates in combination with a stabilizing support means which is located adjacent one of the pivot points of the parallel clamp. The stabilizing support means includes a support plate pivotally mounted at the pivot point opposite the biasing spring and parallel to the side members joined at the pivot point. A clamping means is non-rotatably attached to the surface of the support plate which is away from the rotating frames and is suitable for gripping a support stake such that the rotating frame trap may be mounted in a selected location. The support plate includes at least three extensions fixedly mounted to the plate and extending in a direction opposite the mounted clamp, and suitable for contacting the side members of the rotating frames to prevent rotation of the frames with respect to the support stake when the frames are held in the open or "set" position. At the same time, the extensions will allow the frames to rotate with respect to each other to the "closed" position when the release catch is triggered.

BRIEF DESCRIPTION OF THE DRAWINGS

The above-mentioned features of the present invention will be more clearly understood from the consideration of the following description in connection with the accompanying drawings in which:

FIG. 1 is a pictorial view of a rotating frame or Conibear trap in combination with the new support clamping means of this invention.

FIG. 2 is a partial side view showing details of the support plate and extension members which contact the side members of the rotating frame.

FIG. 3 shows a partial cutaway view of the adjustable band clamp disclosed in this invention.

BEST MODE FOR CARRYING OUT THE INVENTION

Referring now to FIG. 1, there is shown a perspective view of the combination rotating frame or Conibear animal trap and the improved clamping and support means of this invention. As shown, the rotating frame clamp includes a first rotating frame 10 and a second rotating frame 12. As shown, the rotating frame 10 includes a front portion 14 shown at the bottom of the FIG. 1 which extends to a rearward portion 16 at the top of FIG. 1. In a similar manner, the forward top most portion 18 of Frame 12 extends to a rearward bottom most portion 20. As can also be seen, the bottom jaw 14 of frame 10 is connected to the top jaw 16 of frame 10 by means of side members 22 and 24. In a similar manner, the bottom jaw 20 of rotating frame 12 is connected to the top jaw 18 of frame 12 by means of side members 26 and 28. Although, not clearly shown in FIG. 1, but fully understood by those skilled in the art, at substantially the center point of side members 26 and 22 there is included pivot means 30 for pivotally joining side member 22 with side member 26. In a similar way, although obscured by the clamping means, side member 28 is pivotally joined at pivot point 32 to side member 24. Located at the first pivot point 30, there is also included a spring biasing means 34 which includes arms 36 and 38 which when unrestrained would move into a position separate from each other. However, as will be appreciated and discussed hereinafter, the trap of FIG. 1 is shown in the "set" or open position such that the arms 36 and 38 of spring member 34 are in a compressed state so that they are substantially adjacent each other.

To maintain the trap in the "set" position as shown in FIG. 1, there is also included a release control or catch means 40 pivotally attached to jaw 16 of rotating frame 10, and releasably hooked to jaw 18 of rotating frame 12. Also included is a triggering mechanism 42 having a sleeve 44 suitable for rotating around jaw 18 of frame 12. Attached to sleeve 44 and included therewith are fingers 46 and 48 such that a minimal amount of force or motion against fingers 46 or 48 will cause rotation of the sleeve member 44 which in turn forces catch means 40 in an upward position such that it no longer hooks or retains jaw 18 of rotating frame 12. It will also be appreciated by those skilled in the art that once catch means 40 is released or unhooked from jaw 18, jaws 16 and 14 of frame 10 will tend to rotate in a counter-clockwise direction as indicated by arrows 50 and 52, and jaws 18 and 20 of frame 12 will tend to rotate in a clockwise position as indicated by arrows 54 and 56. This rotation is of course forced by the spring 34 as spring arms 36 and 38 tend to separate and thereby bring jaw 18 of frame 12 in substantial contact with jaw 14 of frame 10 while at the same time bringing jaw 16 of frame 10 into substantial contact with jaw 20 of frame 12. It will also be noted that biasing spring 34 also includes a securing hook 58 such that the arms 36 and 38 of spring 34 can be held in position by the hook 58 while the trap is being set.

Referring now to FIG. 1 in combination with FIG. 2, the improved stabilizing clamping means of this invention is shown in detail. As can be seen, and as was discussed hereinabove, side member 24 is pivotally mounted to side member 28 by means of pivot point 32. Also pivotally mounted and connected at pivot point 32 is support plate 60 which is located parallel to the side members 24 and 28. As can be seen more clearly in FIG. 2, support plate 60 includes extensions 62, 64, 66 and 68 which are positioned such that when the rotating frame trap is in the open or "set" position, side member 24 is in contact with extension members 64 and 66, and side member 28 is in contact with extensions 62 and 68. Thus, it will be appreciated that once the trap is in the "set" or open position, it is impossible for the rotating frames to rotate or move with respect to the supporting plate 60. Also as shown, there is an adjustable band clamp 70 which is attached in a non-rotating manner to support plate 60. That is, the band clamp 70 is not free to move or pivot with respect to support plate 60. Band clamp 70, may be attached to support plate 60 by means of welding or may be detachably mounted to support plate 60 by a mounting bolt or screw, FIG. 3. Further, band clamps 70 although typically made of metal, may also be made of a non-corrosive material such as nylon, poly vinyl chloride or the like.

Referring now to FIGS. 1 and 3, the operation of the adjustable clamp 70 may be more clearly understood. As shown, the adjustable clamp 70 is non-rotatably mounted to support plate 60 at the point of fastener 72. The adjustable clamp 70 in the embodiment illustrated includes bands 74 and 76 which are suitable for extending around a support stake such as shown in phantom lines 78 of FIG. 3. In the embodiment shown, thumbscrew mechanism 80 is fixedly attached to the portion 76 of band 70 and this mechanism includes a thumbscrew 82 such that rotation of the thumb screw will change the overall diameter of the adjustable band. Thus, it will be appreciated that the combination of the rotating frame trap with the adjustable band clamp 70 may be selectively located on a supporting stake 78 at any desired location and at any suitable position. It will also be appreciated that the overall combination can be specifically located in the swim path of the fur bearing animals such as the mink beaver or muskrat. Thus, when the animal swims or moves through the open frames 10 and 12 and encounters the trigger fingers 46 and/or 48, jaw 16 of frame 10 and jaw 20 of frame 12 rotate toward each other, and in the same manner jaw 14 of frame 10 and jaw 18 of frame 12 rotate toward each other thereby capturing the animal.

It has also been found that although support plate 60 may typically be constructed with four extensions, such as extension 62, 64, 66 and 68, a minimum of only three such extensions will provide the necessary support to prevent rotation. Thus as shown in FIG. 2, the plate could be manufactured with portion 84 (shown as being separated from the remainder of plate 60 by dashed lines 86) missing such that extension 66 is not present.

Thus, although the present invention has been described with respect to specific apparatus for providing a combination rotating frame trap and adjustable support clamp, it is not intended that such specific references be considered limitations upon the scope of this invention except insofar as is set forth in the following claims.

What is claimed is:

1. In combination, a single spring rotating frame trap with a stabilizing clamp comprising:

a rotating frame animal trap including;

pivotally mounted jaws formed of a pair of frames, each one of said pair having two parallel side members and two parallel jaw members substantially perpendicular to said side members, said pair of frames being pivotally mounted with respect to each other at a first and further pivot point located at each of said side members such that said parallel jaws of one of said frames rotates to a closed position proximate said parallel jaws of said other frame;

means adjacent said first pivot point for biasing said jaws in said closed position, releasable catch means for holding said jaws in an open position against said biasing means, and a trigger means for releasing said catch means; and a stabilizing support clamp located adjacent said further pivot point and comprising, a support plate pivotally mounted at said further pivot point and parallel to said side member, clamp means non-rotatably attached to said support plate away from said rotating frames for gripping a support stake to maintain said trap in a selected location prior to the firing of said trap and maintain said trap secured to said stake subsequent to said trap fixing, at least three extensions fixedly mounted to said support plate and extending in a manner for contacting said side members of said pair of frames to prevent rotation of said frames with respect to said support stake when said frame is held in said open position, while at the same time allowing said frames to rotate with respect to each other to said closed position when said release catch is triggered.

2. The combination of claim 1 wherein four extensions are attached to said support plate such that two extensions contact the side members of one of said pair of frames and the remaining two extensions contact the side members of the other of said pair of frames.

3. The combination of claims 1 or 2 wherein said clamp means is an adjustable band clamp.

4. The combination of claim 3 wherein said adjustable band clamp includes a thumb screw for adjustment.

5. The combination of claim 3 wherein said band clamp is made of a non-corrosive material.

6. The combination of claim 3 wherein said band clamp is detachably mounted to said support plate.

* * * * *